United States Patent

[11] 3,584,886

| [72] | Inventors | Fred E. Simpson<br>Washington;<br>Edwin M. Kirchgessner; Bernard F.<br>Kupfert, Peoria, all of, Ill. |
|------|-----------|---|
| [21] | Appl. No. | 820,365 |
| [22] | Filed | Apr. 30, 1969 |
| [45] | Patented | June 15, 1971 |
| [73] | Assignee | Caterpillar Tractor Co.<br>Peoria, Ill. |

[54] SEAL FOR HIGH SPEED APPLICATION
10 Claims, 1 Drawing Fig.

| [52] | U.S. Cl. | 277/92 |
|------|----------|--------|
| [51] | Int. Cl. | F16j 15/54 |
| [50] | Field of Search | 277/81, 92, 96; 251/368 |

[56] References Cited
UNITED STATES PATENTS

| 941,605 | 11/1909 | Baekeland | 251/368X |
|---------|---------|-----------|----------|
| 2,425,209 | 8/1947 | Snyder et al. | 277/96 |
| 3,480,908 | 9/1949 | Davies | 277/96 |
| 3,452,995 | 7/1969 | Engelking | 277/92 |

Primary Examiner—Laverne D. Geiger
Assistant Examiner—Robert I. Smith
Attorney—Fryer, Tjensvold, Feix, Phillips & Lempio ABSTRACT: A seal having a ramped member fixed within a counterbore in a nonrotatable member and a ramped ring separated from and supported relative to the fixed member by a torus. A sealing band on the ramped ring cooperates with a similar band on a ring fixed on a shoulder of a rotating member.

PATENTED JUN 15 1971
3,584,886
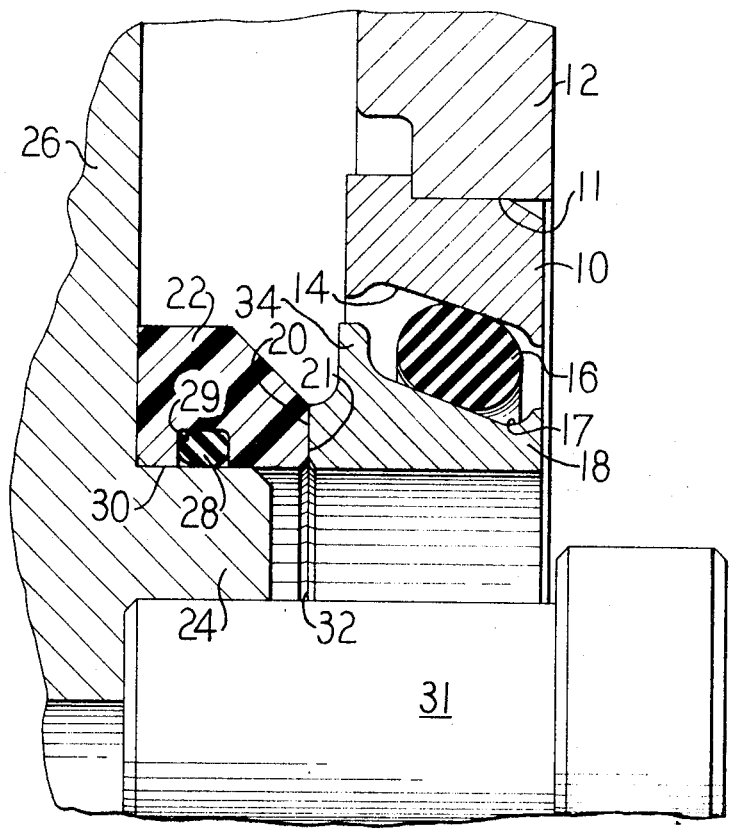
INVENTORS
EDWIN M. KIRCHGESSNER
BERNARD F. KUPFERT
FRED E. SIMPSON
BY
ATTORNEYS

SEAL FOR HIGH SPEED APPLICATION

BACKGROUND AND SUMMARY OF THE INVENTION

Several attempts to adapt dual cone seals to crankshaft applications have been made. However problems have been encountered in these attempts which have been difficult to overcome.

One of the primary problems encountered is that of space limitations. It has been quite difficult to adapt the general arrangement of the dual ring seals to the small space available between the crankshaft, flywheel, and cylinder block. When various attempts were made to overcome this problem with presently available seals, it was realized that the surface speed at the sealing surfaces of the ring is highly critical. In order to decrease the surface speed, it became necessary to reduce the diameter of the sealing band.

However, the decrease in the sealing band diameter does not eliminate the problem of separation between the seals due to the centrifugal force on the lubricant in the tapered region between the rings leading into the sealing band. Reduction of the amount of oil in that area by elimination of the tapered surface causes the seals to run dry, resulting in failure as a result of scuffing from the metal-to-metal contact of the sealing ring.

In the present invention, therefore, the metal-to-metal contact on such seals has been eliminated by providing at least one of the rings forming the seal band be of a self-lubricating material. The dual cone ring principle is utilized in one of the sealing members, resulting in a greater flexibility of the sealing surfaces with a substantially constant load on the face of the sealing band. The diameter of the sealing has been reduced, thereby reducing the surface speed of the sealing ring, by placing the sealing band on the inner ring of the dual cone sealing member. Further, the provision of a narrow sealing band serves to reduce the problems in machining a flat sealing surface for contact with the mating sealing surface.

A controlled taper leading into the sealing band reduces the amount of lubricant in that area, thereby eliminating most of the centrifugal force in the area so as to decrease or eliminate the spreading apart of the sealing rings at high speeds. Since one ring is of a self-lubricating material, no scuffing of the sealing band during intervals of slight lubrication will occur. The self-lubricating member may be mounted on a rotatable part so that its shape is maintained without any reinforcing member constructed therein, and an O-ring on its inner diameter will provide a positive static seal between the member and the rotating part.

This invention, together with its further objects, advantages, modes, and embodiments, will become obvious to those skilled in the art by reference to the Detailed Description and accompanying drawing which illustrates what is presently considered to be the preferred embodiment of the best mode contemplated for utilizing the novel principles set forth in the claims.

BRIEF DESCRIPTION OF THE DRAWING

The FIGURE illustrates an enlarged fragmentary sectional view of a seal according to the present invention.

DETAILED DESCRIPTION

Although the instant invention can be utilized with any apparatus in which a rotating shaft extends out of the chamber containing lubricant, the specific application described here for purposes of illustration will be discussed with reference to an engine having a crankshaft extending therefrom. With reference to the drawing, therefor, an adapter 10 is shown pressed into a counterbore 11 in the rear wall 12 of a cylinder block. The adapter is provided with a tapered surface 14 to provide the action necessary for a torus ring 16 to maintain the prescribed axial force on an opposed, tapered surface 17 on an inner ring 18.

A sealing band 20 located on ring 18 engages with a mating sealing band or face 21 of a ring 22. Ring 22 is circular in shape and is pressed onto shoulder 24 of a flywheel 26. An O-ring-type seal 28 within a groove 29 in the ring 22 provides a positive seal between the shoulder 24 and the inner diameter 30 of the ring. The flywheel 26 is, in turn, attached to the end of a crankshaft 31.

As shown, the sealing members together form a tapered area 32 leading to the sealing band formed between surfaces 20 and 21.

In a preferred embodiment, each side of the tapered portion 32 may be machined at a small angle, such as 15°, relative to its respective sealing surface, producing a total tapered portion angle of 30°, for example. Further, each tapered surface of the tapered area 32 is manufactured to have as small a dimension as possible—much smaller than the sealing band surface. For example, if the sealing band surface is 0.125 inch wide, each tapered surface could be approximately 0.032 inch wide.

Since the tapered area 32 is, ideally, at least as small as that described above, only a small amount of lubricating fluid will reach the sealing band. In order to keep the seal from failing during periods of light or no lubrication, the ring 18 may be manufactured from metal such as 1020 carburized and hardened steel, and ring 22 may be made of a composition of phenolic resin impregnated with graphite. Obviously, rings 18 and 22 could be manufactured of other materials having similar properties, so long as a self-lubricated rotation is allowed between the rings.

If the seal is to be used in application where the pressure within the engine, to the right of the seal, might be sufficiently high to blow the torus 16 from between the ring, an extension or rim 34 of the ring 18 may be positioned as shown so as to obviate the possibility of the blow out. Further, if desired, the adapter 10 may be manufactured as an integral part of the nonrotatable member 12.

Thus the applicants have provided an embodiment of a new and improved concept in the sealing art which yields a true advance in the art. Many further modifications and alterations will be obvious to those skilled in the art, wherefore what we claim as the invention is:

I Claim:

1. A seal for use in conjunction with a rotatable shaft which passes through an opening in a wall of a chamber containing lubricant, comprising:
    a first ring member fixed about the opening in the wall,
    a first conical surface on the first ring member,
    a ring member suspended within and concentric with the first conical surface,
    said suspended ring member being of unitary, one piece construction,
    a second conical surface on the suspended ring member and opposed to the first conical surface,
    a compressible torus between the first and second conical surfaces serving to suspend the ring member within the first conical surface and also biasing the ring member toward a position away from the chamber,
    a sealing band on the suspended ring member on a side thereof away from the chamber,
    a second ring member fixedly mounted on the rotatable shaft adjacent the suspended ring member,
    a sealing band on the second ring member in abutment with the sealing band of the suspended ring member, and
    cooperating tapered surfaces on the suspended ring member and the second ring member adjacent the abutting sealing bands for delivery of lubricant from the chamber to the sealing bands.

2. The seal of claim 1 wherein
    the sealing bands of the suspended ring member and the second ring member are closely adjacent the inner diameters thereof so as to decrease the relative speed of rotation therebetween.

3. The seal of claim 1 wherein
    the sealing bands on both ring members are relatively larger in width than the tapered surfaces on both ring members.

4. The seal of claim 1 wherein
at least one of the ring members is formed from a self-lubricating material.
5. The seal of claim 1 including
means on the suspended ring member for preventing the compressible torus from being expelled from between the conical surfaces by pressure within the chamber.
6. The seal of claim 1 wherein
the second ring member is formed from phenolic resin impregnated with graphite.
7. A seal for use in conjunction with a rotatable shaft which passes through an opening in a wall of a chamber containing lubricants, comprising:
a dual cone-type seal fixedly mounted within the opening, said dual cone-type seal comprising,
a first ring member fixed about the opening in the wall,
a first conical surface on the first ring member,
an inner ring member suspended within and concentric with the first conical surface,
said inner ring member being of unitary, one-piece construction,
a second conical surface on the inner ring member and opposed to the first conical surface,
a compressible torus between the first and second conical surfaces serving to suspend the ring member within the first conical surface and also biasing the ring member toward a position away from the chamber,
a sealing band adjacent the inner diameter of the inner ring,
a relatively smaller tapered surface extending from the inner diameter surface to the sealing band on the inner ring,
a rotatable ring mounted on the shaft,
a sealing band on the rotatable ring in abutment with the inner ring sealing band,
a relatively smaller tapered surface extending from the inner diameter surface to the sealing band on the rotatable ring, and
a lubricant holding area formed by the tapered surfaces for lubricating the sealing bands.
8. The seal of claim 7 including
sealing means between the rotatable ring and the shaft.
9. The seal of claim 7 wherein
each of the sealing bands is on the order of four times as wide as its adjacent tapered surface.
10. The seal of claim 7 wherein
each tapered surface extends from its adjacent sealing band at an angle of approximately 15° relative thereto.